UNITED STATES PATENT OFFICE.

NATHAN SULZBERGER, OF NEW YORK, N. Y.

NONPYROPHORIC CATALYSTS AND PROCESS FOR EFFECTING CATALYTIC REACTIONS THEREWITH.

1,426,517.  Specification of Letters Patent.  Patented Aug. 22, 1922.

No Drawing.  Application filed September 11, 1916. Serial No. 119,553.

*To all whom it may concern:*

Be it known that I, NATHAN SULZBERGER, a citizen of the United States, residing in the city, county, and State of New York, have invented certain new and useful Improvements in Nonpyrophoric Catalysts and Processes for Effecting Catalytic Reactions Therewith; and I do hereby declare the following to be a full, clear, and exact description of the invention, such as will enable others skilled in the art to which it appertains to make and use the same.

This invention relates to novel non-pyrophoric catalysts and metallic products and to improvements in the art of effecting catalytic reactions in which such novel non-pyrophoric catalysts are utilized.

In my Patent No. 1,164,141, granted December 14, 1915, I have described and claimed a process for reducing metal compounds by treating such compounds with basic nitrogen-hydrogen compounds which are effective reducing agents, such as hydrazin, in the presence of an inciting metal of the platinum group, such as palladium or platinum, or mixtures thereof.

The present invention relates to non-pyrophoric catalysts and metal products obtainable by such a process as that of said prior Patent No. 1,164,141, and to effecting catalytic reactions by the utilization of such nonpyrophoric catalysts as are thus obtainable. It is well known that metallic nickel obtained by reducing nickel oxide or similar reducible nickel compounds at relatively high temperatures with hydrogen, can be used for effecting catalytic reactions, particularly reactions of reduction. Metallic nickel produced in this way, at temperatures which make the product catalytically active, is a strongly pyrophoric product, that is to say, it becomes incandescent spontaneously when exposed to the air at ordinary temperatures immediately after reduction. In order to overcome such pyrophoric properties, special precautions are necessary in handling the reduced nickel or in treating it to neutralize or overcome its pyrophoric properties.

The present invention relates to catalysts which are produced in a wet way, as distinguished from catalysts produced by reduction with hydrogen at high temperatures, and to a catalyst which as produced is nonpyrophoric.

Certain compounds containing nitrogen and hydrogen, particularly hydrazin, possess reducing properties, but cannot be used directly as reducing agents for reducing nickel compounds. Such reducing properties can, however, be increased and made to exert themselves even upon nickel compounds, if certain metal compounds, which may be called inciting agents, are added, even in very small amounts. As such metals I have found those belonging to the platinum group especially valuable, notably platinum and palladium. Other metals and other salts may also be employed, provided they exert the desired inciting effect.

The following example describes the production of a product illustrative of the present invention: 10 grams of nickel sulfate are dissolved and to the green solution thus formed is added about $\frac{1}{10}$ of 1% of platinum in the form of a 10% solution of platinum chloride. The mass is then heated after adding a solution of hydrazin sulfate in an excess of caustic soda. The liquor soon becomes black and in a short time precipitates all its metallic contents in the form of a black powder which is separated, washed and dried on the water bath. It represents a nickel powder containing a very small amount of platinum and well adapted for catalytic purposes. The powder is strongly magnetic and does not heat up or become incandescent even when exposed to the air immediately after reduction, as do finely divided nickel products obtained by reducing nickel compounds with hydrogen at higher temperatures.

The method of preparing catalytically active products by a wet process, specifically described above, may be variously modified. Thus, instead of a platinum compound, some other compound of a metal belonging to the platinum group, like palladium, may be employed, as well as other metals which may be precipitated in a metallic or reduced condition from a solution by means of hydrazin, like silver, gold, copper, etc., and which are effective inciting agents.

Instead of using the compound of a metal or compounds of a mixture of metals to "incite" the reducing action of the hydrazin, such metal or metals may in many cases also be made use of in their metallic or other active state.

Instead of using hydrazin sulfate and caustic soda, free hydrazin may also be used, as well as, in some cases, liquids containing hydrazin as such, or containing reagents which, under the conditions of the process, will react to form hydrazin. Thus, where hydrazin is used, it may not be necessary to separate and isolate it before use, but in some instances, e. g. with nickel salts, it can be used in solution in the liquid in which it is produced; or it may even be produced during the same operation when its reducing properties are utilized.

The compound to be reduced may be either in solution or in suspension, that is to say, the metal compounds, such as nickel compounds, may be either those which are soluble or those which are insoluble but which can be maintained in suspension. Thus, nickel borate is insoluble in water but its suspension in water containing even very small amounts of inciting metal compounds such as those of platinum or palladium results in its reduction with change in color and darkening and final precipitation, particularly on heating. The nickel catalyst is thus obtainable as a black voluminous spongy mass, leaving the liquid from which it is separated clear.

Instead of nickel sulfate or nickel borate, other compounds of nickel, which are soluble in water, may be reduced, as well as other insoluble compounds such as nickel hydroxide, provided the inciting metal or metals or metal compounds are present. So also, reducible compounds of other metals than nickel can be similarly treated, for instance, compounds of cobalt, uranium, or mixtures of two or more metal compounds, etc. Such compounds, which cannot be reduced to a metallic or catalytically active state by hydrazin alone, can nevertheless in many cases, be reduced by the hydrazin in the presence of such inciting metals or metal compounds as those referred to above.

The products produced as described, contain not only the reduced nickel or other metal in a catalytically active state, but they contain also the inciting metal or metals. Thus, in the case of the reduction of a solution of nickel sulfate with a platinum or palladium salt in solution as the inciting agent, the resulting product is a composite product produced by the simultaneous reduction and precipitation of the nickel and platinum or palladium, and containing these metals in a most intimate state of combination. They are, in fact, both co-precipitated and co-reduced, and are thus distinguished.

Instead, however, of using the compounds to be reduced in solution, they may, as described, in some cases, be reduced in suspension, in which case the products will not be co-precipitated, but may be co-reduced, to give resulting composite products containing both the nickel or similar metal and the inciting metal in a most intimate state of combination.

Where the inciting metal is itself in a metallic form, such as colloidal platinum or palladium, the product will still contain the reduced nickel and the platinum or palladium in an intimate state of combination.

It is one characteristic advantage of products produced in the manner described that the inciting metal or metal compound gives to the resulting product an enhanced value for catalytic purposes, metals such as platinum or palladium even in very small amounts, promoting the catalytic action of such metals as nickel.

The nickel itself is, moreover, in a particularly finely divided form, because of the process by which it is produced. Thus, sintering or shrinking or agglomerating of the reduced product, which may take place at high temperatures where hydrogen is used as the reducing agent are avoided in the wet process by which the products of the present invention are produced. These products are, moreover, non-pyrophoric, as already pointed out, not being spontaneously ignitable or incandescent, when exposed to the air immediately after reduction at ordinary temperatures.

The high catalytic efficiency of catalysts produced in the manner described is shown by the ease with which unsaturated compounds such as cottonseed oil or other fatty acids or oils can be reduced with hydrogen, by their use. It is also shown by the fact that cinnamic acid is easily reducible by their use to hydro-cinnamic acid. The substance to be reduced can be treated directly or it can be treated while dissolved or suspended in a suitable vehicle, petroleum being of particular value for this purpose. Petroleum of various boiling points from petroleum ether up to the high boiling paraffin is available for use in this manner. If the petroleum is made up of saturated compounds, it will remain unchanged during the operation; if it contains unsaturated compounds, they may be partially or completely reduced and saturated at the same time as the substances which are dissolved or suspended in them.

Where it is desired to produce colloidal products, or products which partake of the nature of colloids, a protective colloid of a suitable nature, e. g. gelatin, etc. may be added. Such a protective colloid may thus be present during the process which results in the production of the hydrazin, and the resulting hydrazin product then used for the reduction. The presence of such a colloid is of value where it is desired to prevent precipitation or to minimize precipitation of the reduced product.

While nickel compounds require the presence of an inciting agent for their reduction by hydrazin, iron compounds can be reduced by hydrazin without the use of such inciting metals, for instance, using a solution of hydrazin sulfate and ammonia; but such inciting metals may nevertheless be used and the advantages incident to their use obtained also with iron. Thus, catalysts in a fine state of division, black in appearance and highly magnetic, non-pyrophoric, and possessing high catalytic activity, are obtainable from metals of the iron group, such as those referred to, by reduction in a wet way with hydrazin in the presence of an inciting metal or agent such as platinum or palladium and their compounds, while iron can be reduced by hydrazin alone.

So also, gold compounds can be reduced by hydrazin alone to give finely divided gold, or to give colloidal gold where a protective colloid is present.

While the products obtained from nickel and other metals possessing catalytic action form valuable catalysts, the products are available for use for other purposes, among which may be instanced nickel or copper mirrors, and certain metallurgical purposes or for pigments or in glass or pottery where a high grade and finely divided metallic powder is desired.

The products of the present invention are capable of regeneration by dissolving in acids and subsequent reduction, after suitable purification if necessary. In most cases it will not be necessary to add any fresh amount of platinum metal, since the solution obtained will usually contain a sufficient amount of such metal to act as the inciting agent during the subsequent reduction with hydrazin, the continued use of the catalyst being thus economical from a commercial standpoint.

Because of the valuable properties possessed by these novel products, they are particularly adapted for catalytic reactions and processes, such as processes of catalytic reduction or hydrogenation, of making formaldehyde, sulfuric acid, etc., by bringing the reacting materials together in the presence of the non-pyrophoric catalysts produced in the wet way as above described.

The novel catalysts of the present invention can be produced and used, per se, or on a support, or in combination with diluents or promoters of various kinds in a finely divided, granular, or other form. Thus, for instance, catalysts may be produced containing silica as such or in combinations which make it of added value as a carrier or promoter.

I claim:

1. In the art of effecting catalytic reactions, the step which comprises bringing together hydrogen and oil to be hydrogenated in the presence of a black non-pyrophoric magnetic catalytically active reduction product of a reducible nickel compound, reduced in a wet way and in the presence of a metal of the platinum group, said product containing the nickel and the metal of the platinum group in an intimate state of combination; substantially as described.

2. The method of effecting catalytic reduction with hydrogen, which comprises causing the hydrogen to act upon the substance to be reduced in the presence of a black non-pyrophoric magnetic powder containing a catalytic metal and produced in a wet way by the reduction of a reducible compound of such metal; substantially as described.

3. The method of effecting catalytic reduction reactions, which comprises bringing together hydrogen and the substance to be hydrogenated or reduced in the presence of a catalytically active reduction product of a reducible nickel compound, reduced in a wet way, in the presence of a metal of the platinum group, said reduction product being a black non-pyrophoric magnetic powder and containing the nickel and the metal of the platinum group in an intimate state of combination; substantially as described.

In testimony whereof I affix my signature.

NATHAN SULZBERGER.